May 8, 1962  J. W. MORROW  3,033,049
FAN DRIVE AND MOUNTING
Filed March 14, 1956  2 Sheets-Sheet 1
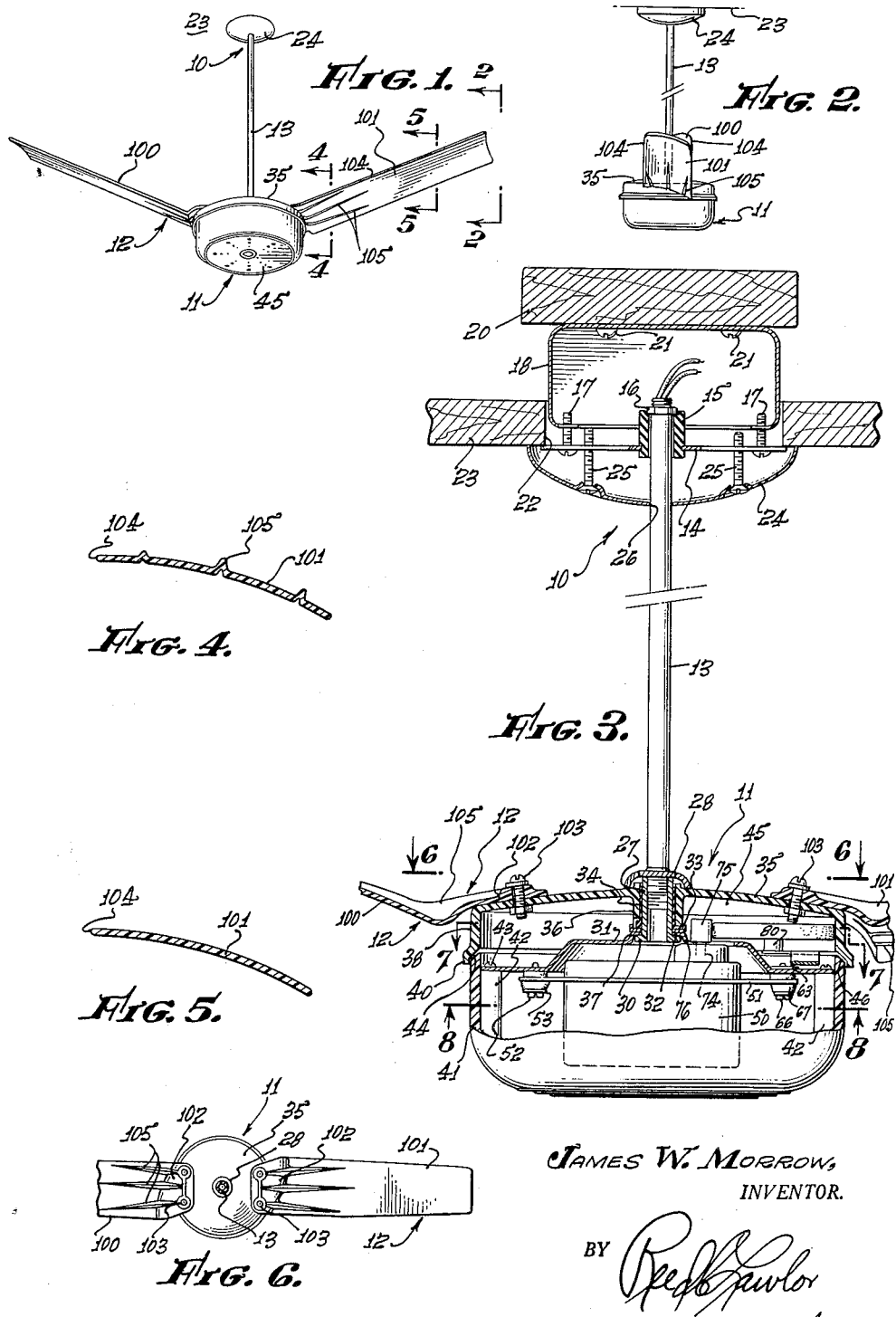
JAMES W. MORROW,
INVENTOR.
BY [signature]
ATTORNEY.

May 8, 1962
J. W. MORROW
3,033,049
FAN DRIVE AND MOUNTING
Filed March 14, 1956
2 Sheets-Sheet 2
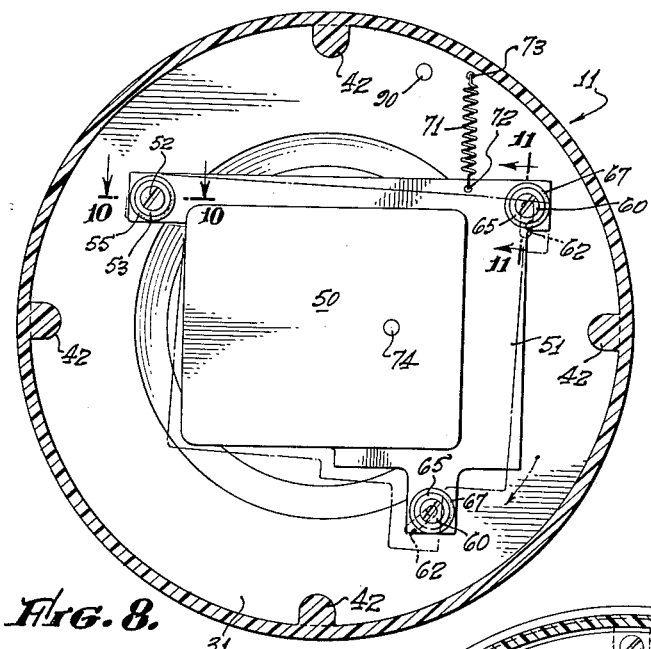
FIG. 8.
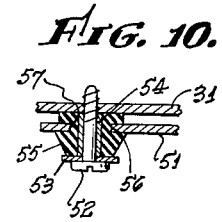
FIG. 10.
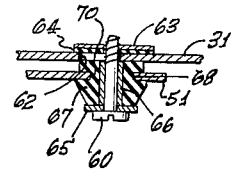
FIG. 11.
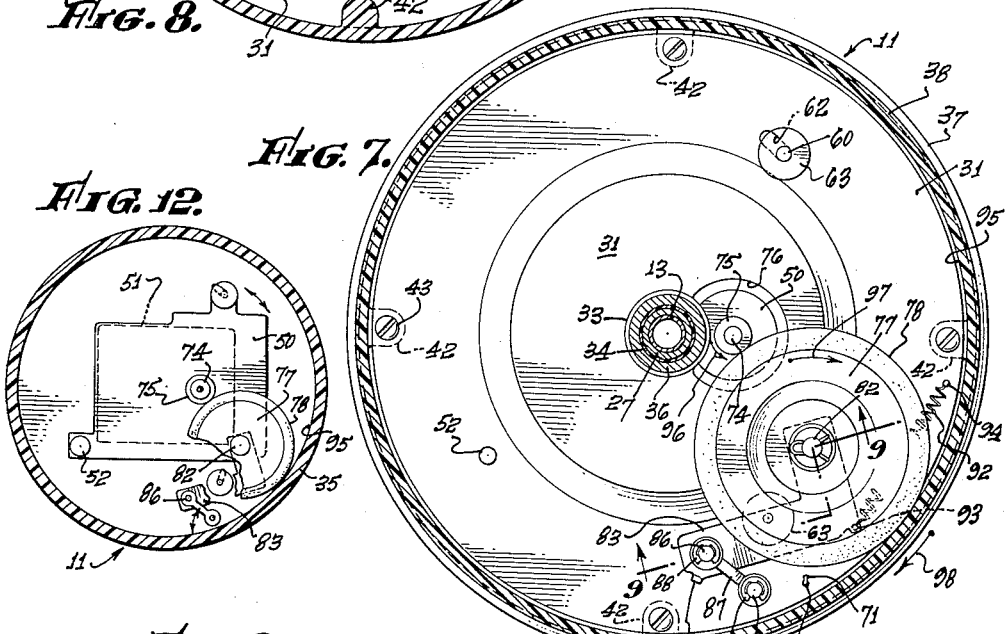
FIG. 7.
FIG. 12.
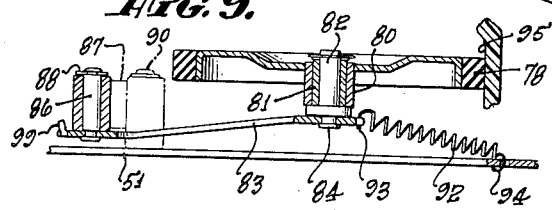
FIG. 9.
INVENTOR.
JAMES W. MORROW,
BY
Reed C. Lawlor
ATTORNEY.

United States Patent Office 3,033,049
Patented May 8, 1962

3,033,049
FAN DRIVE AND MOUNTING
James W. Morrow, 1637 Torcida Drive, La Canada, Calif.
Filed Mar. 14, 1956, Ser. No. 571,568
13 Claims. (Cl. 74—209)

The present invention relates geneanrlly to fans and relates more specifically to insect repellant type fans, commonly employed over eating areas, doorways and the like.

For a considerable period of time, it has been known that a slight draft of air will create an atmosphere inimical to insects such as flies, etc. Such drafts of air have been provided through the use of overhead suspended fans rotating at relatively low speeds.

Most of such fans utilized heretofore have been primarily devoted to industrial or commercial uses such as in stores, restaurants, hotels, etc.; however, considerable advantage has been found to exist in home use of this type of fan. For example, contemporary living patterns devote considerable time, in fairweather conditions, to outdoor cooking and eating such as around or near an outdoor barbecue unit, individual family picnic tables and the like. In such situations, the presence of insects render the outdoor activities unpleasant and unhealthful.

Fans designed for similar purposes and used primarily in commercial installations are ordinarily not satisfactory for domestic use. Such commercial units are generally too large and are more expensive than is normally warranted for domestic use. They are not only heavy and cumbersome but also are normally dangerous for operation in home situations.

Several specific problems have heretofore existed relative to the manufacture, operation, and periods of inoperation of insect repellant fans. For example, many of the fans of this character that have been known heretofore have employed heavy duty electric motors that have been costly to operate, have been noisy in operation, and have had serious disadvantages when permitted to remain at rest for any extended lengths of time. These disadvantages have taken the form of deterioration or corrosion of the various elements or the form of binding of driving and speed-reducing mechanisms or both. Furthermore, individual fan units have heretofore been limited in operational effectiveness to relatively small areas.

It is accordingly one important object of the present invention to provide an insect repellant fan that is simple in construction, light in weight, safe in operation, and inexpensive in manufacture.

It is another object of the invention to provide an insect repellant fan having a novel speed reducing and driving means disposed between an electric motor and fan blading thereof.

A further important object of this invention is to provide novel blading for use in combination with other components of an insect repellant fan.

Still another object of this invention is to provide an insect repellant fan having quiet operational characteristics together with smooth and silent starting and stopping.

A detailed object of the invention is to provide a fan driving mechanism employing a shiftable puck arrangement intermediate a driving motor and the blade supporting structure.

Other and further important objects of the invention will become apparent from the disclosures in the following detailed specification, appended claims and accompanying drawings, wherein:

FIGURE 1 is a perspective view showing the insect repellant fan of this invention;

FIG. 2 is a side elevational view of the fan, as taken substantially as indicated by line 2—2 of FIG. 1;

FIG. 3 is an enlarged sectional view taken along the vertical axis of the present fan;

FIG. 4 is an enlarged fragmentary sectional view through a portion of one of the fan blades, as taken substantially as indicated by line 4—4 of FIG. 1;

FIG. 5 is a sectional view similar to FIG. 4, showing another portion of the fan blade, as taken substantially as indicated by line 5—5 of FIG. 1;

FIG. 6 is a top plan view of the fan housing, rotor and blade supporting arrangement;

FIG. 7 is an enlarged transverse sectional view taken substantially as indicated by line 7—7 of FIG. 3, and showing details of the driving mechanism for the fan blading;

FIG. 8 is a transverse sectional view taken in a direction opposite from the direction of FIG. 7, and as indicated generally by line 8—8 of FIG. 3;

FIG. 9 is an enlarged fragmentary sectional view through the puck driving arrangement, as taken substantially as indicated by line 9—9 of FIG. 7;

FIG. 10 is a detail fragmentary sectional view showing the pivotal supporting arrangement for the electric driving motor taken on the line 10—10 of FIG. 8;

FIG. 11 is a detail fragmentary section view showing a guiding structure for movement of the electric motor by the pivot shown in FIG. 10 and taken substantially as indicated by line 11—11 of FIG. 8; and FIG. 12 is a partially schematic view showing the driving arrangement for the present fan structure.

With reference primarily to FIGS. 1, 2 and 3 of the drawings, the present insect repellant fan comprises, generally, a supporting structure 10, a blade support and driving assembly 11 and blading in the form of a pair of blades 12.

The supporting structure 10 includes an elongated, vertically disposed support rod 13 that has the upper end thereof secured to a mounting plate 14, by means of a sleeve 15 and nut 16 that threadably engages the upper end of the rod 13. The mounting plate 14 is secured, as by screws 17, to a conventional electric outlet box 18 which is in turn secured to a suitable stationary supporting block 20 or the like, as by screws 21. The mounting plate 14 is further adapted to provide a cover for an opening 22 in a ceiling or the like 23, with the entire mounting arrangement and mounting plate 14 being covered by means of an escutcheon cover member 24, that is secured, by means of screws 25, to the mounting plate 14.

The cover member 24 has a central opening 26 through which the mounting rod 13 extends. The lower end of the rod 13 is threadably secured and keyed to an upper end of a sleeve 27, the rod being provided with a collar 28 for limiting travel of the rod into the sleeve. The lower end of the sleeve 27 is outwardly flanged as at 30. A motor support member 31, having a central apertured boss 32, is suspended from the flange 30. A cup-shaped washer 33 is disposed about the sleeve 27 in contact with the boss 32 of the motor support member 31. A bushing 34 is journaled about the outer surface of the sleeve 27 with a flanged lower end portion thereof positioned in contact with the cup-shaped washer 33.

As shown primarily in FIG. 3, an inverted cup-shaped rotor member 35, having a hub portion 36, is keyed to the bushing 34 as at 37. The rotor 35 forms a portion of the driving unit 11 and has a peripheral downwardly extending integral flange or cylindrical wall 38 that is radially outwardly beveled at 40 about the lower edge thereof. The driving unit 11 further includes a cup-shaped annular housing 41 having an open upper portion and vertically elongated projections 42. The motor supporting member 31 is secured to the upper ends of the projections 42 by means of screws 43 which threadably engage the projections. Thus the housing 41 is supported by means of the motor supporting member 31 and the sleeve 27 on the lower end of the supporting rod 13. The upper peripheral edge of the housing 41 is beveled as at 44 and disposed in mating spaced relationship to the outwardly beveled portion 40 of the rotor 35, with the portion 40 extending slightly over an upper outer surface of the housing 41, whereby to provide a waterproof seal for the interior of the rotor 35 and the housing 41. Horizontally extending radial ribs 45 on the inner surface of the rotor 35 act as an impeller that sucks air through holes in the lower part of the housing 41, circulating it in the space within the rotor and housing and forcing it outwardly through the annular opening 46 between the beveled parts 40 and 44. This forced ventilation of the interior of the housing cools the motor and other parts enclosed by the rotor 35, 38 and housing 41 and also aids in preventing ingress of water through the annular opening 46.

As shown primarily in FIGS. 3 and 8, an electric motor 50, having a mounting plate 51, is disposed within the confines of the housing 41. The motor 50 is disposed for pivotal movement to the underside of the motor support member 31 and is shiftable about an axis defined by a stationary mounting screw 52, FIG. 10, which threadably engages the motor support member 31. The mounting screw 52 has a washer 53 positioned beneath the head thereof and is surrounded by a metallic sleeve 54 that is in turn carried by a flexible grommet 55. The grommet 55 has an annular groove 56 in the periphery thereof and is positioned in an opening 57 in the motor mounting plate 51. This construction serves to resiliently support the motor 50 and to provide for vibration dampening thereof. The motor 50 is further supported by means of movable screws 60, FIGS. 8 and 11, which are disposed upwardly through relatively short arcuate slots 62 in the motor supporting member 31. Each of the movable screws 60 threadably engages annular nuts 63, there being annular bearing members 64 positioned about the movable screws and adapted for disposition between the nuts 63 and the upper surface of the motor supporting member 31. The screws 60 are each provided with a washer 65 beneath the heads thereof, sleeves 66 surrounding the shanks of the screws and flexible mounting grommets 67 carried by the sleeves 66. The grommets 67 are provided with annular grooves 68 which are adapted for reception in openings 70 in the motor mounting plate 51.

Thus it may be seen that the motor 50 is shiftably supported about the axis of the screw 52 within the predetermined limits of travel of the slots 62 for a purpose to be hereinafter more fully described. Additionally, the motor 50 is biased in a direction whereby to dispose the screws 60 in one end of the slots 62, by means of a tension spring 71, FIG. 8, which has one end secured to the motor mounting plate 51 as at 72 and the other end secured to a motor support member 31 as at 73.

The electric motor 50 has an output shaft 74 on which a driving roller 75 is mounted. The output shaft 74 and the driving roller 75 extend upwardly through an opening 76 in the motor support member 31 as shown in FIG. 3. Accordingly, the driving roller 75 moves with the motor 50 about the screw 52 as the motor is shifted.

A puck-type drive is provided between the motor 50, the driving roller 75 thereof and the rotor 35 as shown in FIGS. 7 and 12. This puck-type drive includes a driving puck 77, having an outer peripheral portion 78 of frictional material, such as rubber or the like, this material being bonded as by cementing to the outer surface of the driving puck. The driving puck 77 is provided with a hub portion 80, FIG. 9, in which a sleeve bearing 81 is positioned. The bearing 81 is journaled on a shaft 82 that is in turn carried by one end of a generally L-shaped lever arm 83 and secured thereto by means of a riveted portion 84. The driving puck 77 is secured against axial movement on the shaft 82 by means of a spring clip that engages in an annular groove in an upper end of the shaft 82. As shown primarily in FIGS. 7 and 9, the end of the L-shaped arm 83 remote from the shaft 82, carries an upwardly disposed shaft 86 on which one end of a link 87 is pivotally mounted. A snapring 88 engages an upper end of the shaft 86 to secure the link 87 thereon. The other end of the link 87 is pivotally journaled on a shaft 90 that is in turn secured to and extends upwardly from the motor supporting plate 31. A snap ring 91 is adapted to engage the upper end of the shaft 90 to secure this end of the link 87 thereto. The lever 83, together with the driving puck 77 are biased in a direction away from the shaft 90 and toward the space between the driving roller 75 and the flange portion 38 of the rotor by means of a tension spring 92, one end of which is secured to the lever 83 as at 93, the other end of which is secured to the motor mounting plate 31 as at 94.

As shown in FIGS. 3, 7 and 12, the driving puck 77 is, by action of the tension spring 92, biased simultaneously into contact with the motor driving roller 75 and an inner annular surface 95 of the flange portion 38 of the rotor 35, thus providing driving means for the rotor 35 upon energization of the motor 50. The tension of the spring 92 is such as to apply only a light loading on the driving puck 77 initially to urge this driving puck into contact with both the driving roller 75 and the driving surface 95 on the rotor 35, when the motor 50 is at rest. Upon energization of the motor 50, and rotation of the driving roller 75 in the direction of the arrow 96, the driving puck 77 is driven in the direction of the arrow 97, thus driving the rotor 35 in the direction of the arrow 98. It is to be noted that the axis of the shaft 82 is positioned at one side of a sector line that extends between point of tangency between the axis of the driving roller shaft 74 and the outer surface of the driving puck and the point of tangency between the outer surface of the driving puck and the driving surface 95 of the rotor 35. Upon energization of the motor 50, through use of the linkage defined by the lever 83 and link 87, the axis of the shaft 82, together with the driving puck 77 moves closer to the beforementioned line, thus disposing the driving puck more tightly between the driving roller 75 and the driving surface 95. This tight driving condition is attained during the early part of the period of acceleration of the motor 50 and any tendency toward binding is automatically relieved by slight shifting movement of the motor 50 against the tension of the spring 71 and about the pivot screw 52 and within the confines of the slots 62. When the motor 50 has reached its normal running speed, the axis of the shaft 82, together with the driving puck 77, moves in a direction away from the aforesaid line with frictional contact between the driving roller 75, the driving puck 77 and the surface 95 of the rotor 35 being maintained by frictional force of the roller 75 against the outer surface of the driving puck 77 and by the light tension of the spring 92. It is to be noted that the link 87 serves to permit free movement of the driving puck 77 in both a circumferential or radial direction.

Upon deenergization of the motor 50, the frictional force of the driving roller 75, tending to move the driving puck 77 in a direction toward the aforementioned line, is relieved, thereby permitting the rotor 35 substantially to be disengaged from the driving roller 75 and to coast to a stop freely without drag on the motor 50 and without subjecting the blades to rapid deceleration. Movement of the driving puck 77 in a direction toward the aforementioned line is limited by engagement of a bent-up tab 99 from the lever 83 acting as a stop member upon engagement thereof with a side of the link 87.

It is to be noted that the motor 50 is mounted within the housing 41 in such a manner as to dispose the center of gravity thereof in the approximate central area and on the axis of the housing. Additionally, the particular motor utilized herein is of the two-pole type, rather than the usual eight-pole, thereby establishing the desired running speed by virtue of the speed reduction accomplished through the relative sizes of the driving roller 75, the driving puck 77 and the rotor driving surface 95. The rotor 35 runs at about 180 r.p.m. when 60 c.p.s. current is supplied to the motor. The use of the frictional puck drive serves further to provide quiet and efficient operation with minimum load being applied to the motor. Accordingly, it is possible efficiently to utilize a motor of low cost and weight in the present apparatus.

As shown primarily in FIGS. 1, 3, 4, 5 and 6, the rotor 35 has the blade arrangement 12 attached to the upper outer surface thereof. The blading 12 includes a pair of blades 100 and 101, each of which has integral mounting portions 102, the lower sides of which are adapted to conform to the shape of the upper outer surfaces of the rotor 35 and are secured thereto by means of screws and nuts 103. The blades 100 and 101 are disposed at a dihedral angle of approximately 150° in a vertical plane. Additionally, the blades 100 and 101 have aproximately a 0° angle of attack but a drag angle of about 30°. The blades are curved in a manner directing the leading edge portions 104 thereof, FIGS. 4 and 5, parallel to the plane of rotation of the blades. For rigidity, the blades 100 and 101 are further provided with integral stiffening ribs 105, which extend from the mounting portions 102 thereof outwardly for a short distance along an inner portion of the blades.

It may thus be seen that the position and dihedral arrangement of the blades 100 and 101 are such as to permit coverage of a relatively large area into which moving air is directed for most effective use of the present fan. Furthermore, the shape of the blades is such as to create a high degree of turbulence, thus creating a wide zone from which insects are repelled.

Several of the components of the present device, such as for example, the rotor 35, housing 41 and blades 100 and 101 are constructed in such a manner as to enable manufacture thereof from relatively inexpensive material, such as for example, plastic or the like. Additionally, the blades 100 and 101 are preferably flexible in order that safe operation may be experienced in the event of contact thereof with foreign objects or persons who may be in the operational area. Additionally, the nonrigid drive of the rotor and the blades defined by the puck driving arrangement, permits additional safety in like situations.

In the event that the present insect repellant fan is permitted to remain idle for a considerable period of time, immediate starting is obtained for continued smooth operation, inasmuch as the light spring pressure causing contact between the resilient surface of the driving puck 77 and the driving roller 75 is of a magnitude insufficient for the formation of dents in the resilient material 78 that would otherwise either create a binding situation or at best provide uneven driving and/or noisy operation.

Having thus described the invention and the present embodiment thereof, it is desired to emphasize the fact that many modifications may be resorted to in a manner limited only by a just interpretation of the following claims.

I claim:

1. In a fan structure, in combination: an annular housing; suspension support means for said housing; an electric motor disposed in said housing and having a rotatable output driving roller, said motor and said roller being shiftable in a horizontal plane within said housing and through predetermined limits of travel, said motor and said roller being mounted on an axis eccentric to the axis of said housing; an axially disposed shaft carried by said housing; a freely rotatable rotor mounted on said shaft; a driving puck disposed directly between said roller and said rotor; and means for shiftably supporting said driving puck relative to said housing and in a horizontal plane radially and circumferentially about an axis of said housing.

2. In a fan mounting, in combination: an annular housing; suspension support means for said housing; an electric motor disposed in said housing and having a rotatable output driving roller, said motor being disposed within said housing with the approximate center of gravity thereof lying on an axis of said housing, said motor and said roller being mounted on an axis eccentric to the axis of said housing, said motor and said roller being shiftable in a horizontal plane within said housing and through predetermined limits of travel; an axially disposed shaft carried by said housing; a freely rotatable rotor mounted on said shaft; a driving puck disposed directly between said roller and said rotor; and means for shiftably supporting said driving puck relative to said housing and in a horizontal plane radially and circumferentially about said axis of said housing, and including means for moving said driving puck toward contact with said motor and said rotor.

3. In a fan drive and mounting, in combination: an annular housing; suspension support means for said housing; an electric motor disposed in said housing and having a rotatable output driving roller, said motor and said roller being shiftable in a horizontal plane within said housing and through predetermined limits of travel; means normally biasing said motor for shiftable movement toward one of said limits of travel; an axially disposed shaft carried by said housing; a freely rotatable rotor mounted on said shaft; a driving puck disposed directly between said roller and said rotor; means for shiftably supporting said driving puck relative to said housing and in a horizontal plane radially and circumferentially about an axis of said housing; and means for biasing said driving puck in its horizontal plane toward contact thereof with said roller and said rotor.

4. In a fan drive mounting, in combination: an annular housing; suspension support means for said housing; an electric motor disposed in said housing and having a rotatable output driving roller, said motor being disposed within said housing with the approximate center of gravity thereof lying on an axis of said housing, said motor and said roller being shiftable in a horizontal plane within said housing and through predetermined limits of travel; means normally biasing said motor for shiftable action toward one of said limits of travel; an axially disposed shaft carried by said housing; a freely rotatable rotor mounted on said shaft and having a flange on a peripheral portion thereof; a driving puck disposed directly between said roller and said flange of said rotor; means for shiftably supporting said driving puck relative to said housing and in a horizontal plane radially and circumferentially about said axis of said housing; and means for biasing said driving puck toward contact thereof with said roller and said flange of said rotor.

5. A combination as in claim 4, wherein said axis of said housing is a vertical axis, and the output driving roller is mounted on a vertical axis eccentric to the axis of said housing.

6. In a fan drive, the combination of: an annular housing having an upwardly directed opening; a motor supporting member connected to said housing and disposed across said opening; an electric motor disposed in said housing, said motor being pivotally mounted on said supporting member and shiftable in a horizontal plane; means for limiting shiftable movement of said motor;

spring means normally biasing said motor toward one limit of shiftable movement thereof; an output driving roller disposed from said motor and through said supporting member; an axially disposed shaft extended upwardly from said supporting member; a supporting structure connected with said shaft for securing said housing to a stationary support; a rotor journaled on said shaft; a downwardly extending flange on said rotor, a lower annular edge of said flange being cooperable with an upper annular edge of said housing to provide a weathertight seal therebetween; a driving puck disposed between said roller and a radially inwardly directed surface of said flange; link means carried by said supporting member, said puck being rotatably mounted on said link means and shiftable thereby in both radial and circumferential directions; and spring means for biasing said link means and said puck in a direction for engagement of said puck with said roller and said flange.

7. In a fan drive and mounting, the combination of: an annular housing having an upwardly directed opening; a motor supporting member connected to said housing and disposed across said opening; an electric motor disposed in said housing, the center of gravity thereof being on the axis of said housing, said motor being pivotally mounted on said supporting member and shiftable in a horizontal plane; means for limiting shiftable movement of said motor; spring means normally biasing said motor toward one limit of shiftable movement thereof; an output driving roller disposed from said motor and through said supporting member; an axially disposed shaft extended upwardly from said supporting member; a supporting structure connected with said shaft for securing said housing to a stationary support; a rotor journaled on said shaft; a downwardly extending flange on said rotor, a lower annular edge of said flange being cooperable with an upper annular edge of said housing to provide a weathertight seal therebetween; a driving puck disposed between said roller and a radially inwardly directed surface of said flange; link means carried by said supporting member, said puck being rotatably mounted on said link means and shiftable thereby in both radial and circumferential directions; and spring means for biasing said link means and said puck in a direction for engagement of said puck with said roller and said flange.

8. A combination as in claim 7, wherein said axis of said housing is a vertical axis, and said output driving roller is disposed on a vertical axis eccentric to said housing axis.

9. In an insect repellant fan, the combination of: an annular housing having an upwardly directed opening; a motor supporting member connected to said housing and disposed across said opening; an electric motor disposed in said housing, the center of gravity thereof being on the axis of said housing, said motor being pivotally mounted on said supporting member and shiftable in a horizontal plane; means for limiting shiftable movement of said motor; spring means normally biasing said motor toward one limit of shiftable movement thereof; an output driving roller disposed from said motor and through said supporting member; an axially disposed shaft extended upwardly from said supporting member; a supporting structure connected with said shaft for securing said housing to a stationary support; a rotor journaled on said shaft; a downwardly extending flange on said rotor, a lower annular edge of said flange being cooperable with an upper annular edge of said housing to provide a weathertight seal therebetween; a driving puck disposed between said roller and a radially inwardly directed surface of said flange; link means carried by said supporting member, said puck having an outer friction driving surface, being rotatably mounted on a free end of said link means and shiftable thereby in both radial and circumferential directions; and spring means for biasing said link means and said puck in a direction for engagement of said puck with said roller and said flange.

10. In a fan drive and mounting: a stationary lower housing member of cup-shape having a vertical axis; support means connected to said lower housing member and extending axially upward therefrom; an electric motor mounted in said lower housing member; a rotor journalled on said support means above said lower housing member, said rotor having a downwardly extending flange overhanging an upper edge of said housing member, and extending outwardly beyond the edge of said housing member; and driving means connected between said electric motor and said rotor to drive the latter, said driving means and motor being positioned and rotated to utilize the inertia of said rotor to connect said motor to said rotor in driving relationship when said motor is energized and to substantially disconnect said motor from said rotor when said motor is deenergized, whereby said rotor may free-wheel.

11. In a fan drive mounting: a housing having a vertical axis; means on said axis for suspending said housing from a stationary support; a rotor mounted rotatably relative to said housing; an electric motor positioned within said housing, the center of gravity of said motor lying substantially on said axis; an output driving member from said electric motor disposed eccentric to said axis; and a puck drive member carried by said housing disposed between said driving member and said rotor to drive the latter.

12. In a fan drive mounting: a housing having a vertical axis; means on said axis for suspending said housing from a stationary support; a rotor mounted rotatably on said axis relative to said housing; an electric motor positioned within said housing on a vertical axis, the center of gravity of said motor lying substantially in said axis; an output driving member extending from said electric motor on an axis eccentric to the above mentioned axis, said motor and said driving member being shiftable in a horizontal plane; and a shiftable speed reducing friction wheel drive disposed between said driving member and said rotor to drive said rotor from said motor.

13. In a fan drive and mounting: a stationary lower housing member of cup-shape having a vertical axis; support means connected to said lower housing member and extending axially upward therefrom; an electric motor mounted in said lower housing member; a rotor journalled on said support means above said lower housing member, said rotor having a downwardly extending flange overhanging and encircling an upper edge of said housing member; and driving means connected between said electric motor and said rotor to drive the latter, said driving means and motor being positioned and rotated to utilize the inertia of said rotor to connect said motor to said rotor in driving relationship when said motor is energized and to substantially disconnect said motor from said rotor when said motor is deenergized, whereby said rotor may free-wheel.

References Cited in the file of this patent

UNITED STATES PATENTS

| Re. 20,285 | Hurxthal | Mar. 9, 1937 |
| 570,651 | Tuerk | Nov. 3, 1896 |
| 591,033 | Collins | Oct. 5, 1897 |

(Other references on following page)

UNITED STATES PATENTS

| | | |
|---|---|---|
| 874,430 | Pither | Dec. 24, 1907 |
| 939,723 | Locke | Nov. 9, 1909 |
| 1,276,601 | Whiting | Aug. 20, 1918 |
| 1,300,236 | Atherton | Apr. 15, 1919 |
| 1,532,402 | Hall | Apr. 7, 1925 |
| 1,633,957 | Schleter | June 28, 1927 |
| 1,816,920 | Sutcliffe | Aug. 4, 1931 |
| 2,161,148 | Erwood | June 6, 1939 |
| 2,262,695 | Moeller | Nov. 11, 1941 |
| 2,296,751 | Van der Woude | Sept. 22, 1942 |
| 2,458,036 | Veitch et al. | Jan. 4, 1949 |
| 2,459,917 | Carrington | Jan. 25, 1949 |
| 2,547,666 | Schneider | Apr. 3, 1951 |
| 2,620,970 | Palmer et al. | Dec. 9, 1952 |
| 2,655,812 | Morrison | Oct. 20, 1953 |

FOREIGN PATENTS

| | | |
|---|---|---|
| 478,417 | Great Britain | Jan. 18, 1938 |